Aug. 2, 1955 W. T. DOBSON III, ET AL 2,714,311
GYROSCOPE GIMBAL BALANCING SYSTEMS
Filed Jan. 28, 1954
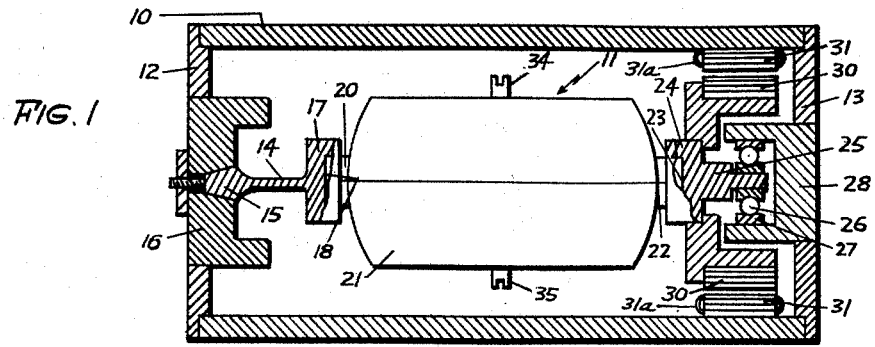
FIG. 1
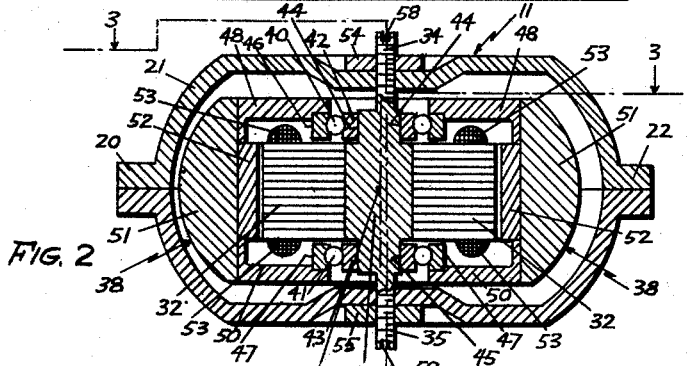
FIG. 2
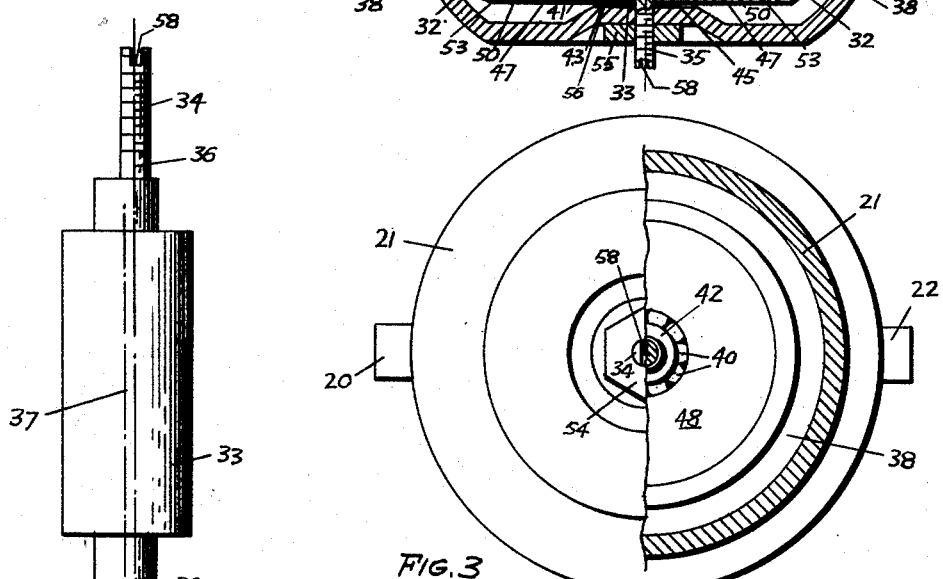
FIG. 3
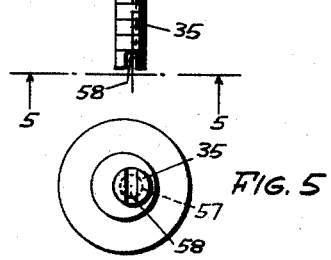
FIG. 4
FIG. 5
INVENTORS
WILLIAM T. DOBSON, III
STANLEY KAHN
BY Elmer J. Gorn
ATTORNEY

United States Patent Office 2,714,311
Patented Aug. 2, 1955

2,714,311

GYROSCOPE GIMBAL BALANCING SYSTEMS

William T. Dobson III, Newton, and Stanley Kahn, Brookline, Mass., assignors to Raytheon Manufacturing Company, Newton, Mass., a corporation of Delaware Application January 28, 1954, Serial No. 406,790

2 Claims. (Cl. 74—5)

This invention relates to means for balancing the gimbal and rotor subassembly of a gyroscope.

In the construction of gyroscopes, it is important to be able to balance the rotor and gimbals about their axes. In certain types of compact motor-driven gyroscopes, the rotor and inner gimbal assembly consists of a motor completely enclosed in a housing that constitutes the inner gimbal which is mounted by means of a shaft and a torsion bar to the outer housing. The shaft also carries a pick-off rotor for electrically sensing the displacement between the two gimbals. In such a small assembly, the usual method of balancing by removing material by drilling and adding material in the form of screws becomes difficult. In the construction of the invention, the stator part of the motor is mounted on a shaft having two threaded extensions having a common axis parallel to but displaced from the axis of the main body of the shaft. The threaded ends of the extensions pass through openings in the housing that constitutes the inner gimbal and are attached by nuts. Balancing is accomplished by shifting the center of gravity of the mass of the motor with respect to the gimbals in two mutually perpendicular planes. The center of gravity is shifted along the axis of the motor by loosening one nut and tightening the other. It is shifted about a plane perpendicular to the axis of the shaft by loosening both nuts and rotating the shaft. Thus the motor assembly is balanced within the gimbals without the necessity of adding weights or drilling holes that might weaken the small structures.

Other and further advantages of the invention will be apparent as the description thereof progresses, reference being had to the accompanying drawings wherein:

Fig. 1 is a longitudinal section through a gyroscopic unit of the invention;

Fig. 2 is a longitudinal section of the inner gimbal and motor subassembly of the gyroscope of Fig. 1;

Fig. 3 is a top view partly in section along the line 3—3 of Fig. 2;

Fig. 4 is a longitudinal view of the shaft of Fig. 2; and

Fig. 5 is an end view of the shaft of Fig. 4 taken along the line 5—5 of Fig. 4.

In Fig. 1, the reference numeral 10 designates a cylindrical case in which is mounted a gimbal and motor assembly 11 supported by end plates 12 and 13. One end of the assembly 11 is mounted on a torsion bar 14 formed with a conical enlargement 15 at one end that fits into a bushing 16 in the end plate 12. The other end of the torsion bar 14 is formed with an enlargement 17 having a recess 18 to receive a stud 20 formed on one end of the axis of the gimbal housing 21. The stud 22 on the other end of the axis of the gimbal housing 21 is received by a recess 23 in an enlargement 24 formed on the end of a stub shaft 25. The shaft 25 is rotatably mounted on a ball bearing 26, the race 27 of which is set in a bushing 28 in the end wall 13 of the case 10. The enlargement 24 supports a plurality of pieces 30 of magnetic material that rotate past a series of coils 31 wound with coils 31a. The details of this pick-off device are no part of the present invention and will not be further described. Any type of pick-off mechanism may be used that will detect angular displacement or the rate of such displacement. The stator 32 of the motor is mounted on a cylindrical shaft 33 formed with threaded rods 34 and 35 projecting from either end with their common axis indicated by the line 36 displaced from the axis of the stator 32 indicated by the line 37. The rotating part 38 of the motor is rotatably supported on the shaft 33 by means of roller bearings 40 and 41. The inner race 42 or 43 of each bearing is attached to a recess 44 or 45 formed on either end of the shaft 33. The outer race 46 or 47 of each roller bearing is attached to a ring 48 or 50 supporting an annular body of metal 51. A band of magnetic material 52 is mounted on the inside of the body 51. Winding 53 is wound on the stator 32. The threaded ends 34 and 35 of the shaft 33 that project through openings in the gimbal 21 are fitted with nuts 54 and 55 to hold the shaft and the stator in position vertically and radially.

The structure is balanced by shifting the center of gravity, indicated by the dot 56 of the subassembly 11, with respect to the case 10 in a vertical direction along the line 37 by loosening one of the nuts 54 or 55 and tightening the other. The center of gravity is shifted about a circle indicated by the dotted line 57 in Fig. 5 in a plane passing through the point 56 and perpendicular to the axis represented by the line 36, by loosening both nuts 54 and 55 and turning the shaft 33. Slots 58 are formed in the ends of the rods 34 and 35 for this purpose.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a gyroscope, a suspended mass, a pair of mounting gimbals adapted to permit the rotation of the suspended mass about two mutually perpendicular axes, means for supporting said mass on the first of said gimbals comprising a central shaft formed with an eccentric cylindrical surface mounted within a cylindrical opening in the said mass concentric with the axis of said mass to permit axial and rotary adjustment of said shaft.

2. In a gyroscope, a suspended mass, a pair of mounting gimbals adapted to permit the rotation of the suspended mass about two mutually perpendicular axes, means for supporting said mass on the first of said gimbals comprising a central shaft formed with an eccentric cylindrical surface mounted within a cylindrical opening in the said mass concentric with the axis of said mass to permit axial and rotary adjustment of said shaft, a pair of openings in the first gimbal adapted to receive the ends of the shaft, threads formed on the outer ends of said shaft and a nut adapted to thread one each end of said shaft.

References Cited in the file of this patent

UNITED STATES PATENTS

| 807,042 | Neiman | Dec. 12, 1905 |
| 1,949,703 | Wettlaufer | Mar. 6, 1934 |

FOREIGN PATENTS

| 20,135 of 1912 | Great Britain | Sept. 4, 1913 |
| 2,120 of 1913 | Great Britain | Jan. 8, 1914 |